United States Patent [19]

Lindner

[11] Patent Number: 5,697,473
[45] Date of Patent: Dec. 16, 1997

[54] BRAKE MECHANISM WITH SIMPLIFIED SEPARATOR SPRINGS

[75] Inventor: Bernard J. Lindner, Brookfield, Wis.

[73] Assignee: Rexnord Corporation, Milwaukee, Wis.

[21] Appl. No.: 615,416

[22] Filed: Mar. 14, 1996

[51] Int. Cl.$^6$ .................................................... F16D 55/22
[52] U.S. Cl. ........................ 188/72.3; 267/180; 192/70.28
[58] Field of Search ................................ 188/71.1, 71.5, 188/72.1, 72.3, 166, 171, 250 E; 192/70.28, 30 V, 101; 267/167, 180, 166.1

[56] References Cited

U.S. PATENT DOCUMENTS

| | | |
|---|---|---|
| 2,620,901 | 12/1952 | Stearns . |
| 3,045,782 | 7/1962 | Hansen . |
| 3,095,068 | 6/1963 | Hansen . |
| 3,171,515 | 3/1965 | Wolfe . |
| 3,175,664 | 3/1965 | Ramsel . |
| 3,221,845 | 12/1965 | Hansen . |
| 3,242,696 | 3/1966 | Kaplan ................ 192/41 R |
| 3,500,971 | 3/1970 | McCarthy . |
| 3,525,424 | 8/1970 | McCarthy . |
| 3,584,720 | 6/1971 | Bark . |
| 3,863,038 | 1/1975 | Kreitner et al. . |
| 3,878,922 | 4/1975 | McCarthy . |
| 4,042,077 | 8/1977 | McCarthy . |
| 4,181,201 | 1/1980 | McCarthy . |
| 4,362,227 | 12/1982 | Walton et al. . |
| 4,763,764 | 8/1988 | Smith ................ 192/41 S |
| 4,798,269 | 1/1989 | Lindner et al. . |
| 4,940,124 | 7/1990 | Galuska et al. . |
| 5,186,287 | 2/1993 | Lindner et al. . |
| 5,421,436 | 6/1995 | Lindner et al. . |
| 5,437,351 | 8/1995 | Lindner . |

FOREIGN PATENT DOCUMENTS

| | | |
|---|---|---|
| 316017 | 3/1934 | Italy . |
| 446143 | 3/1949 | Italy . |
| 404971 | 3/1974 | U.S.S.R. . |

OTHER PUBLICATIONS

Stearns Spring-Set Brakes Parts list for 55,000 Series, PTC Sheet 309, p. D-607-1 effective Oct. 31, 1985.
Stearns Spring-Set Disc Brakes, Catalog No. 200, 68910M, Stearns Division, Copyright 1989 by Rexnord Corporation.
Stearns Spring-Set Brakes Parts List for 55, 000 Series Brakes, Sheet 313, p. S-610-1, effective Oct. 18, 1989.

Primary Examiner—Robert J. Oberleitner
Assistant Examiner—C. T. Bartz
Attorney, Agent, or Firm—Andrus, Sceales, Starke & Sawall

[57] ABSTRACT

In a brake for an electric motor, stepped helical coiled separator springs (302, 304, 306, 308, 310, 312) urge separation of pressure plates (36, 36a) and friction discs (26, 26a) in the released position of the brake, to reduce brake drag. Each separator spring is an integrally continuously coiled spring (312) having an open coil section (314) extending axially from an abutment surface (336) of the pressure plate (36a). Each separator spring has a closed coil section (318) meeting the open coil section (314) at a step transition (338) in diameter at the pressure plate abutment surface (336) and extending through an aperture (330) in the pressure plate (36a) in the opposite axial direction and press-fit therein.

11 Claims, 5 Drawing Sheets ns of a shaft journaled in a motor frame. One or more friction discs secured to the shaft rotate therewith about the axis of the shaft. An end plate is secured to the motor frame, and has one or more non-rotatable pressure plates mounted thereto for axial movement toward and away from the friction discs. A support plate is mounted to the end plate and has a lever mounted thereto for pivotal movement toward and away from the pressure plates. Braking engagement compression springs bias the lever against the pressure plates to engage the friction discs and axially force the friction discs against the end plate to stop rotation of the friction discs and the motor shaft. A solenoid is secured to the support plate and has a reciprocally movable plunger connected to the lever and movable to a first position moving the lever in one axial direction away from the pressure plates against the bias of the compression springs to release the friction discs and permit rotation of the motor shaft. The plunger is movable to a second position permitting the lever to move under the bias of the compression springs in the opposite axial direction toward and engaging the pressure plates such that they engage the friction discs and force the latter against the end plate to prevent rotation of the motor shaft. This basic structure is common in the industry.

It is known in the prior art to provide separator springs urging the pressure plates in an axial direction away from the end plate to separate the friction discs and pressure plates, to reduce brake drag when the actuating mechanism is in the released position. The present invention provides improvements in simplification, cost reduction, ease of maintenance, enhanced performance, and longer life and durability, in separator spring application. The invention enables the use of particularly simple spring structure in a separating spring application in a brake mechanism.

BRIEF DESCRIPTION OF THE DRAWINGS

Prior Art

FIG. 1 is an exploded perspective view of a brake mechanism.

FIG. 2 is a side view and partial cross-section of a brake mechanism.

FIG. 3 is a further exploded view of the brake mechanism of FIG. 1.

FIG. 4 is a top planar view of the brake mechanism of FIG. 3.

FIG. 5 is an enlarged partial cross-sectional view taken along line 5—5 of FIG. 4, showing the braking position.

FIG. 6 is similar to FIG. 5, but shows the released position.

FIG. 7 is an enlarged detailed view taken along line 7—7 of FIG. 5.

Present Invention

Figures 3, 3A:
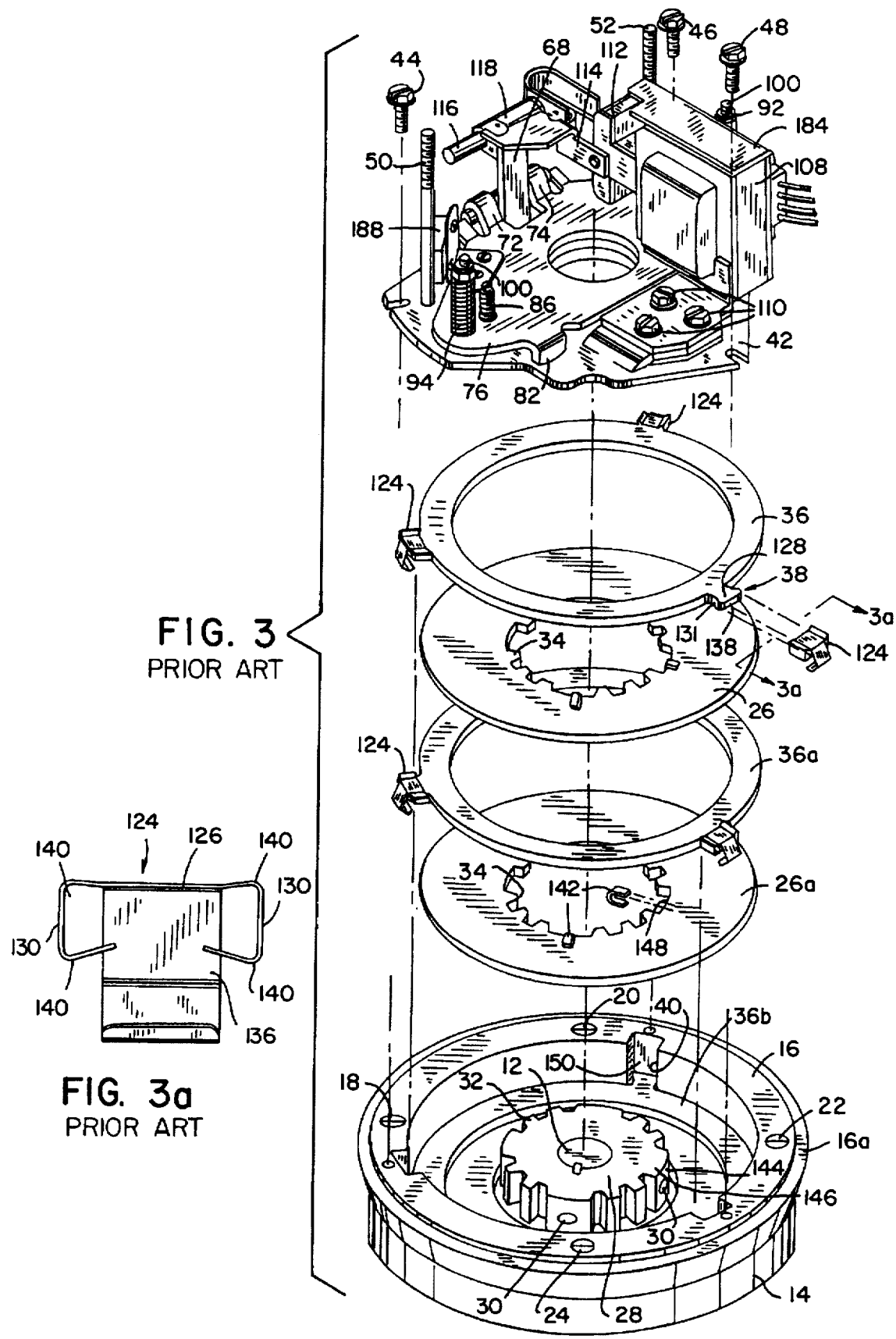
FIG. 3a is an enlarged planar view of a separator spring.
Figure 4:
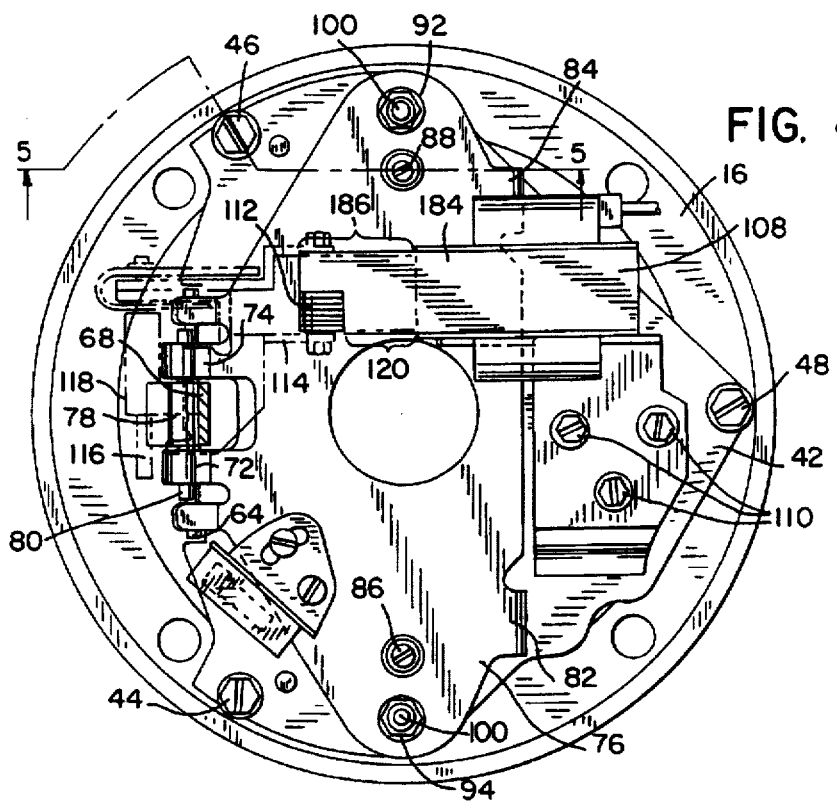
Figure 8:
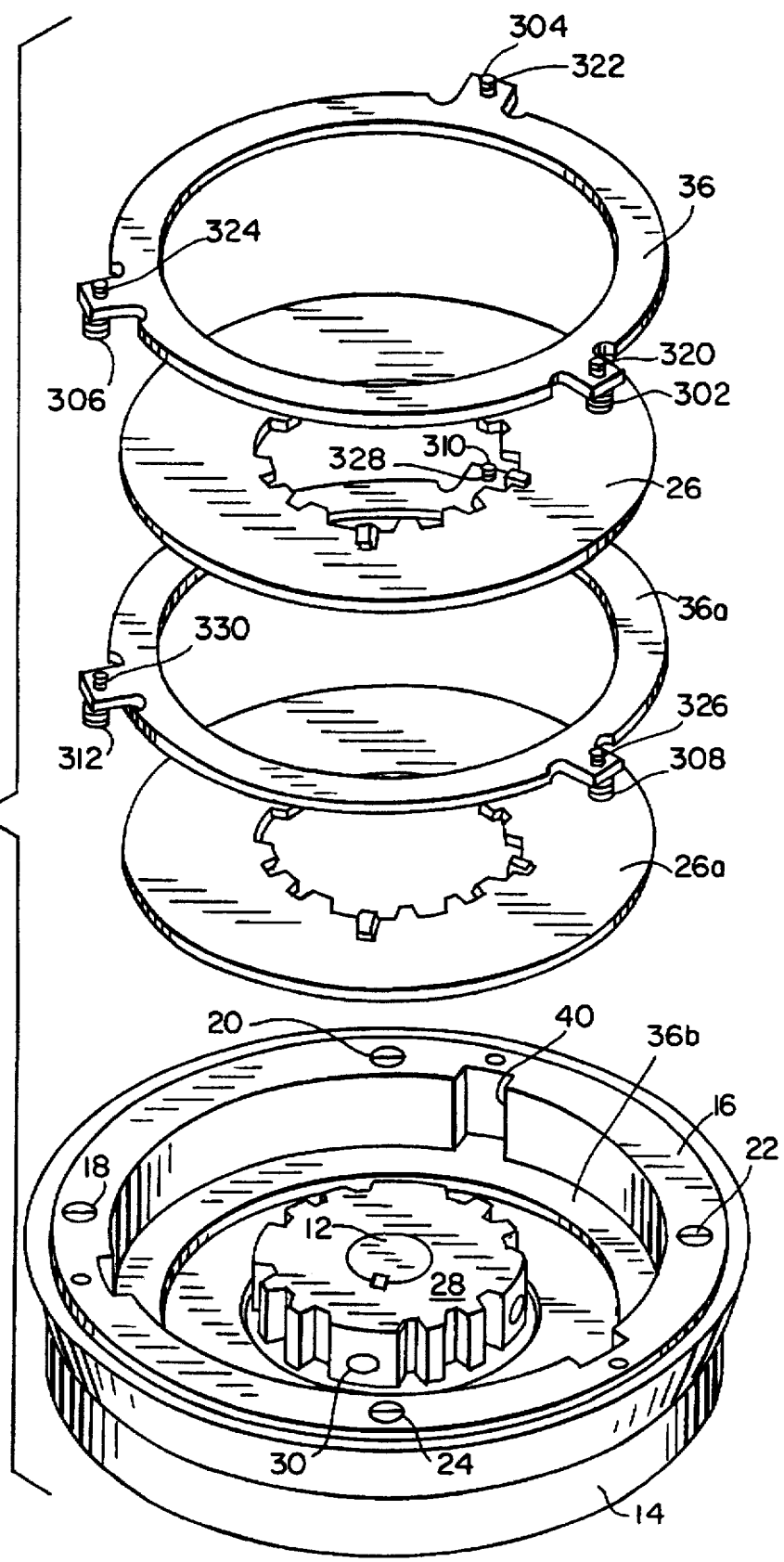

FIG. 8 is a view like a portion of FIG. 3, but showing the present invention.

Figure 5:
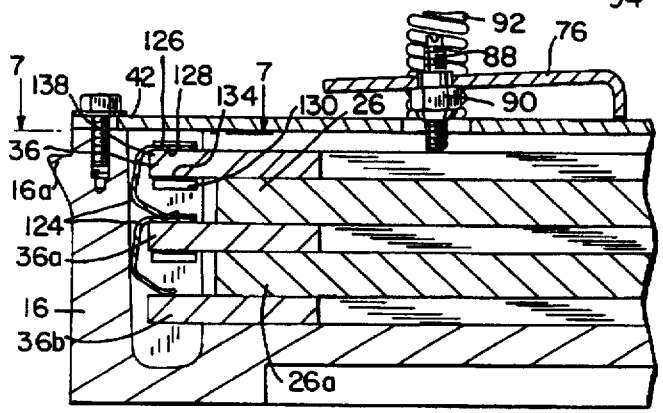
Figure 7:
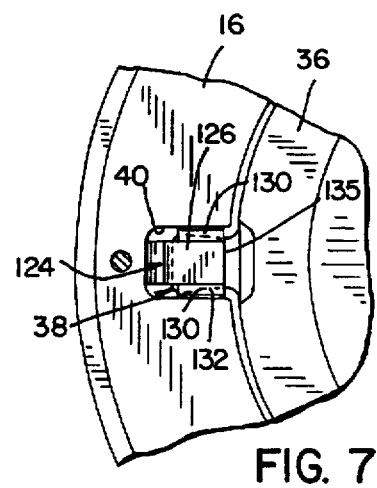
Figure 9:
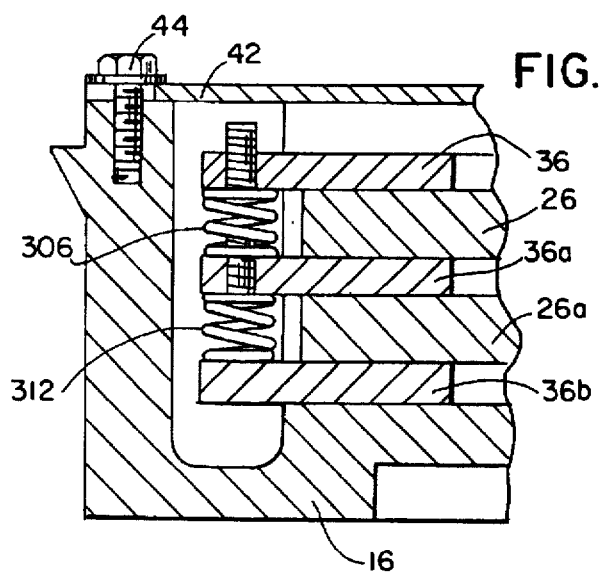

FIG. 9 is a view like a portion of FIG. 5, but showing the present invention.

Figure 6:
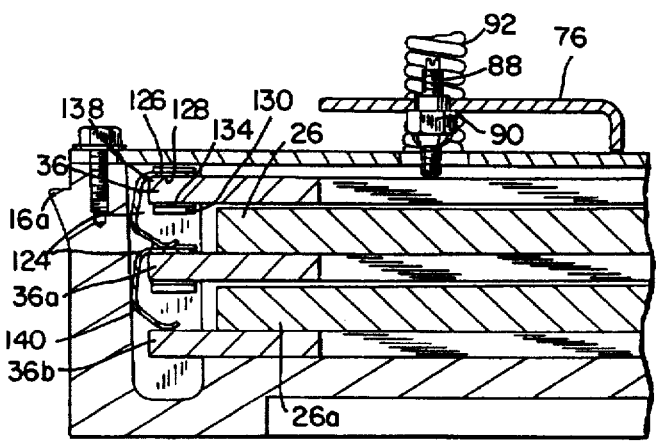
Figure 10:
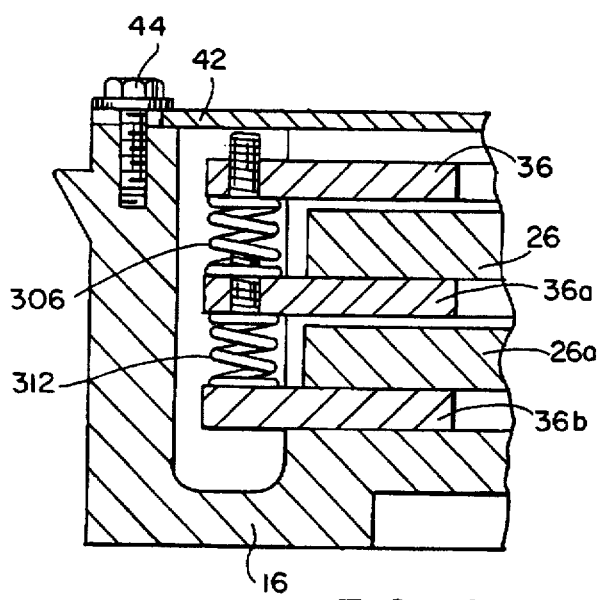

FIG. 10 is a view like a portion of FIG. 6, but showing the present invention.

Figure 11:
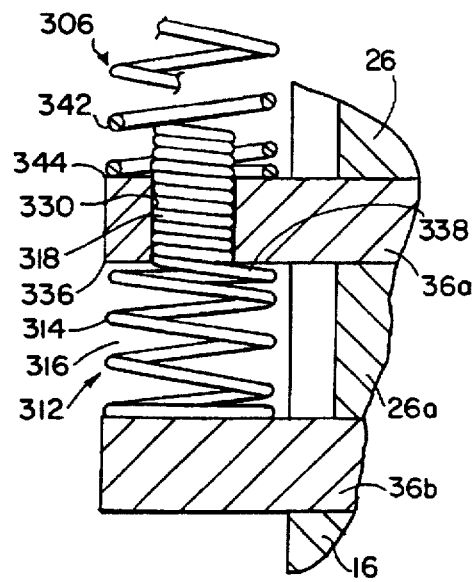

FIG. 11 is an enlarged view of a portion of FIG. 9.

Figure 12:
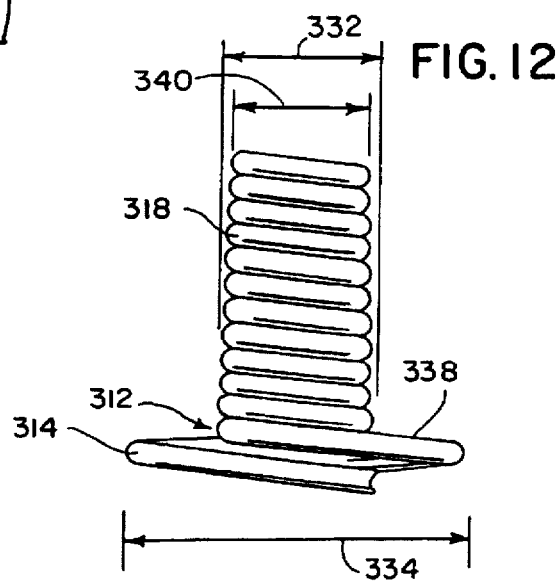

FIG. 12 is an enlarged view of a portion of FIG. 11.

DETAILED DESCRIPTION

Prior Art

FIGS. 1–7 are taken from incorporated U.S. Pat. No. 5,421,436 and show a brake mechanism as described in such patent beginning at column 3, line 39, and which description is repeated here for ease of review.

FIGS. 1–7 depict a standard brake mechanism 10 for selectively stopping or permitting rotation of a rotatable motor shaft 12 journaled in a motor frame 14. Brake mechanism 10 includes an end plate 16 which receives shaft 12 therethrough and is secured to motor frame 14 by four bolts 18, 20, 22, 24 (FIG. 3). End plate 16 is circular in configuration and is provided about its periphery with an outwardly flaring lip 16a for a purpose to be understood hereafter. Brake mechanism 10 includes one or more friction discs 26, 26a secured to shaft 12 for rotation therewith about the axis of shaft 12. In the preferred embodiment, shaft 12 has a keyed hub 28 mounted thereto by two set screws, such as 30 (FIG. 3) and has circumferential teeth 32 mating with teeth 34 in friction discs 26, 26a. One or more non-rotatable pressure plates 36, 36a, 36b are mounted in end plate 16 for axial movement toward and away from friction discs 26, 26a. Pressure plates 36, 36a, 36b are provided about their circumference with outwardly projecting tabs 38 which are keyed into respective slots 40 formed in end plate 16 at locations 120° apart and are axially slidable in such slots 40.

Figures 1, 2:
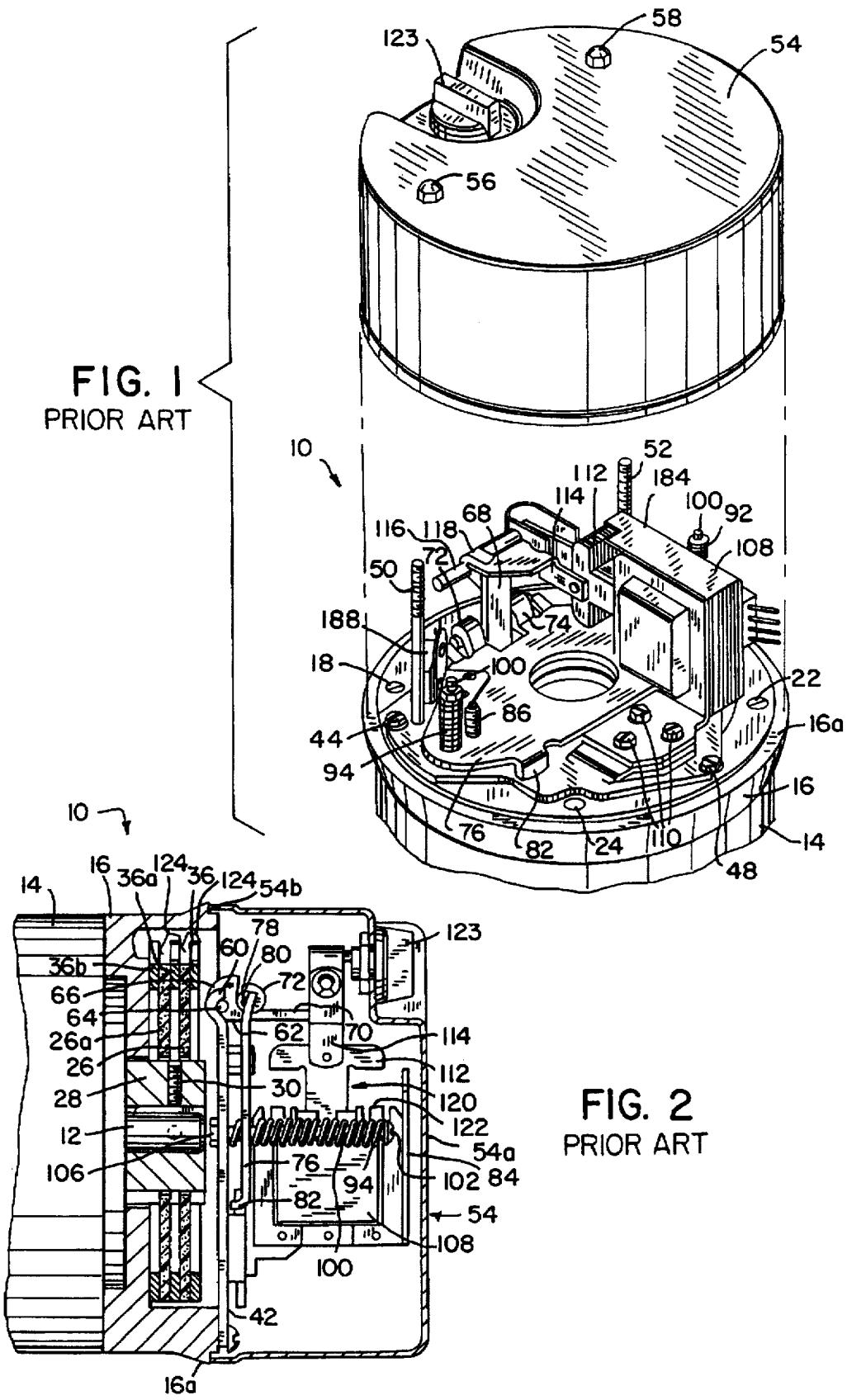
FIGS. 1–7 are taken from incorporated U.S. Pat. No. 5,421,436.

A support plate 42 is secured to end plate 16 by three screws 44, 46, 48 which are threaded into end plate 16. Support plate 42 carries two mounting studs 50, 52 aligned with respective apertures formed in a protective, hollow, cylindrical housing 54 and received in nuts 56, 58. Housing 54 has a continuous wall 54a and an open end 56b which is disposed to tightly bear against outwardly flaring lip 16a on end plate 16 when nuts 56, 58 are tightened on studs 50, 52. Two fingers 60 (only one of which is seen in FIG. 2) at the top of support plate 42 define a bearing surface 62 for a pivot pin 64 which passes through a bearing end 66 of the solenoid lever 68. A portion 70 of lever 68 extends between two ears 72, 74 formed at the top of a lever arm 76. A bearing 78 is disposed between ears 72, 74 and against bearing end 66, and pivots on a bearing pin 80 disposed in ear 72, 74. The bottom of lever arm 76 has two feet 82, 84 which bear against support plate 42. Lever arm 76 includes two adjustment screws 86, 88 which extend through lever arm 76 as well as support plate 42 and are screw threaded into respective nuts 90 disposed between lever arm 76 and support plate 42. Biasing means is provided by two compression springs 92, 94 biasing lever arm 76 and its adjustment screws 86, 88 towards pressure plate 36 such that pressure plates 36, 36a, 36b engage friction discs 26, 26a and prevent rotation of shaft 12. Compression springs 92, 94 surround respective studs 100 and are compressed between lever arm 76 and stud heads 102, 104. Studs 100 are threaded into respective nuts 106 disposed behind support plate 42.

A solenoid 108 is secured to the bottom of support plate 42 by screws 110 and has a reciprocally movable plunger 112 joined to a bracket 114 pivotally mounted on a bearing pin 116 extending through a connector end 118 of solenoid lever 68. Plunger 112 is movable in a first vertical direction, downwardly in FIG. 2, to a first position pivoting solenoid lever 68 downwardly and causing bearing end 66 to urge bearing 78 away from bearing pin 80. As seen in FIG. 6, this action moves lever arm 76 away from support plate 42 and pressure plate 36 against the bias of springs 92, 94 to release friction discs 26, 26a and permit rotation of shaft 12. Solenoid 108 is electrically wired to be energized at the same time the electric motor assembly is energized. Upon energization of solenoid 108, plunger 112 is magnetically attracted downwardly in FIG. 2 to close gap 120 such that plunger 112 engages solenoid abutment surface 122. Upon de-energization of solenoid 108, plunger 112 moves upwardly returning solenoid lever 68 and bearing 78 and permitting lever arm 76, as shown in FIG. 5, to move under the compression of springs 92, 94 such that pressure plates 36, 36a, 36b engage friction discs 26, 26a and prevent rotation of shaft 12. A rotatable release mechanism 123 is provided on housing 54 to manually retract plunger 112 so that brake mechanism 10 can be externally released for service or emergency applications.

Adjustment screws 86, 88 of lever arm 76 adjust the range of motion through which lever arm 76 travels to engage pressure plate 36 at the left end of adjustment screws 86, 88 in FIG. 2. Rotation of screws 86, 88 also compensates for wear experienced by friction discs 26, 26a. Brake mechanism 10 has an installed condition mounted to motor frame 14 and a detached condition removed from motor frame 14. Brake mechanism 10 is a self-contained unit in each of such conditions.

A plurality of spring clips 124 are slidably attached to and envelope certain peripheral portions of the pressure plates 36, 36a, namely outwardly projecting tabs 38, for urging the pressure plates 36, 36a away from the friction discs 26, 26a when solenoid 108 is energized and the brake is released to minimize brake drag caused by contact of the pressure plates 36, 36a, 36b on friction discs 26, 26a during rotation of motor shaft 12. When the motor and brake are mounted in a vertically oriented position, the gravitational weight of the pressure plate 36, 36a themselves may cause drag on the friction discs 26, 26a and create heat and cause unnecessary wear and shortened life. It is known in the prior art to provide leaf springs mounted to the end plate for such purpose and it is also known to provide small low force compression springs for such purpose as shown in "Sterns Spring Set Disc Brakes Parts List for 55,000 Series" reference FIGS. G, H, I, J, and K. In the latter embodiment, the structure is modified by drilling holes in the end plate and in the pressure plates and inserting pins for receiving the low force compression springs. It is known to use low force compression springs around a set of studs spaced circumferentially around the friction discs and mounting the pressure plate means to the end plate means. The minimizing brake drag is enabled by slidably attaching spring clips 124 around tabs 38 of the pressure plate 36, 36a without otherwise modifying the structure which prevents rotation of pressure plates 36, 36a relative to end plate 16. It should be noted that no spring clips 124 are slidably mounted on pressure plate 36b which is designed to be pressed against end plate 16 during braking. The set of slots 40 formed axially in end plate 16 provides both functions of non-rotatably mounting pressure plates 36, 36a, 36b to end plate 16 and mounting spring clips 124 on tabs 38.

Each of spring clips 124 comprises a top portion 126 extending across an upper surface 128 of tab 38. Wing portions 130 extend laterally from each side of top portion 126 around side surfaces 132 of tab 38 and under a lower surface 134 of tab 38. A seen best in FIG. 7, tab 38 is provided with a rear stop surface 135 against which spring clip 124 is firmly held. A leaf spring portion 136 extends from top portion 126 around in spaced relation to front surface 138 and lower surface 134 of tab 38. Leaf spring portion 136 is engageable between adjacent pressure plates 36, 36a, 36b at locations defined by tabs 38. Each of wing portions 130 and leaf spring portion 136 are formed with rounded sections 140 effective to prevent tab from rattling in slots 40 during operation of brake mechanism 10 and providing noise suppression comparable to anti-rattle leaf spring 84 in above noted U.S. Pat. No. 4,798,269. Additional noise suppression is provided by hub stabilizing springs 142 comparable to hub stabilizing spring 92 of U.S. Pat. No. 4,798,269. Hub stabilizing springs 142 are disposed between an outer edge 144 of a respective "double tooth" 146 of hub 28 and a respective inner radial surface 148 of respective friction disc 26a. Hub stabilizing springs 142 apply a slight radial force against the friction discs 26, 26a to take up backlash and muffle backlash noise that occurs between hub 28 and friction discs 26, 26a when the motor is started and stopped, as in U.S. Pat. No. 4,798,269.

Spring clips 124 prevent the tabs 38 of the pressure plates 36a, 36b from being thrusted into the slot edge 150 from rotational forces during a stop and from gouging the end plate slots 40, thereby reducing braking torque. In addition, spring clips 124 have universal application irregardless of brake application, i.e. manufacture and replacement of different sized spring clips is not necessary, which makes orientation-free mounting much easier.

Present Invention

FIGS. 8-12 illustrate the present invention and use like reference numerals from above where appropriate to facilitate understanding. The brake mechanism selectively stops and permits rotation of motor shaft 12 journaled in motor frame 14. Friction discs 26, 26a are secured to shaft 12 for rotation therewith about the axis of the shaft. The discs are keyed to hub 28 on shaft 12, as above. Pressure plates 36, 36a are guided by end plate 16 at slots 40 for axial movement toward and away from the friction discs and are restrained by slots 40 in end plate 16 against rotation. As above, the actuating mechanism, FIG. 3, has a first braking position, FIGS. 5 and 9, applying a force against the pressure plates in an axial direction toward end plate 16 to engage and stop rotation of discs 26, 26a, and hence stop rotation of motor shaft 12. The actuating mechanism has a second released position, FIGS. 6 and 10, permitting rotation of discs 26, 26a, and motor shaft 12.

A plurality of separator springs urge pressure plates 36, 36a away from end plate 16 to reduce brake drag when the actuating mechanism is in the released position, FIG. 10. It is preferred that a set of separator springs be provided for each pressure plate, for example a first set of springs 302, 304, 306 for pressure plate 36, and a second set of springs 308, 310, 312 for pressure plate 36a. In brakes having only a single friction disc, separator springs are typically not provided because a single disc is light enough to have only minimal brake drag when the brake is mounted vertically, i.e. motor shaft 12 extends vertically. In brakes having two or more friction discs, the use of separator springs is preferred, to minimize brake drag caused by the weight thereof when the brake is mounted vertically.

Each separator spring, for example spring 312, FIGS. 11 and 12, is an integrally continuously coiled spring. The spring has an open coil section 314, i.e. axial gaps 316 between the coils. The spring has a closed coil section 318 extending through a respective aperture in the pressure plate in the opposite axial direction. Pressure plate 36 has apertures 320, 322, 324 receiving the respective closed coil sections of respective separator springs 302, 304, 306. Pressure plate 36a has apertures 326, 328, 330 receiving respective closed coil sections of respective separator springs 308, 310, 312. Closed coil section 318, FIG. 12, has a smaller diameter 332 than the diameter 334 of open coil section 314. Each pressure plate, such as 36a, FIG. 11, has an axially facing abutment surface 336. Closed coil section 318 of separator spring 312 meets open coil section 314 at a step transition 338 in diameter at abutment surface 336.

As above described, each separator spring is a stepped helical coiled spring having a first diameter section 314, FIGS. 11 and 12, and a second smaller diameter section 318. Each stepped helical coiled spring is an integral member having a plurality of integrally wound coils having a step transition 338 in diameter between first section 314 and second section 318. The step transition 338 is at an axially facing abutment surface 336 of the respective pressure plate such as 36a. The helix of the first section 314 of the coiled spring extends axially from abutment surface 336. The helix of the second section 318 of the coiled spring extends from the abutment surface 336 axially away from first section 314. In the orientation of FIG. 11, the helix of section 314 extends axially downwardly from abutment surface 336, and the helix of section 318 extends axially upwardly from abutment surface 336 through aperture 330 in pressure plate 36a. The integrally wound coils of section 318 axially abut each other in tight wound relation in each of the braking position, FIG. 9, and the released position, FIG. 10, of the brake. Section 318 of the coiled spring extends axially through aperture 330 in press-fit relation to retain spring 312 on pressure plate 36a.

Pressure plate holes 302, 304, 306, 308, 310, 312 are spaced radially outward of respective friction discs 26, 26a. As above described, the smaller diametered section 318 of each separator spring extends axially away from the larger diametered section 314 and into a respective hole 330 in a respective pressure plate. The diameters of the coils of section 318 decrease, FIG. 12, as section 318 extends away from section 314, such that the diameters 340 of coils farthest away from section 314 are smaller than the diameters 332 of coils closer to section 314. Section 318 of the separator spring thus tapers to a narrower width 340 as it extends away from section 314. The narrowing taper facilitates ease of insertion of section 318 into hole 330. In the orientation of FIG. 11, section 318 of separator spring 312 is pushed and press-fit upwardly into hole 330 of pressure plate 36a. The larger diametered section 342 of the upper separator spring 306 rests against upper axial abutment surface 344 of pressure plate 36a and circumscribes upper section 318 of separator spring 312 in spaced relation therearound.

It is recognized that various equivalents, alternatives and modifications are possible within the scope of the appended claims.

I claim:

1. A brake mechanism for selectively stopping and permitting rotation of a shaft journaled in a motor frame, comprising:

a friction disc secured to said shaft for rotation therewith about the axis of said shaft;

an end plate secured to said motor frame;

a pressure plate axially movable toward and away from said friction disc and restrained against rotation, said pressure plate having a plurality of axial holes therethrough radially outward of said friction disc;

an actuating mechanism having a first braking position applying a force against said pressure plate in an axial direction toward said end plate to engage said disc and stop rotation of said disc and said shaft, said actuating mechanism having a second released position permitting rotation of said disc and said shaft;

a plurality of separator springs, each being an integrally continuously coiled helical spring having an open coil section extending axially from said pressure plate, and a closed coil section extending through a respective aperture in said pressure plate in the opposite axial direction, each of said sections being an axially extending helix.

2. The brake mechanism according to claim 1 wherein said closed coil section has a smaller diameter than said open coil section.

3. The brake mechanism of claim 2 wherein the pressure plate has an axially facing abutment surface, and wherein said closed coil section of said spring meets said open coil section at a step transition in diameter at said abutment surface, said coiled spring being coiled about an axis which extends along said axial direction and provides biased separation of said pressure plate away from said end plate along said axis.

4. A brake mechanism for selectively stopping and permitting rotation of a shaft journaled in a motor frame, comprising:

a friction disc secured to said shaft for rotation therewith about the axis of said shaft;

an end plate secured to said motor frame;

a pressure plate axially movable toward and away from said friction disc and restrained against rotation;

an actuating mechanism having a first braking position applying a force against said pressure plate in an axial direction toward said end plate to engage said disc and stop rotation of said disc and said shaft, said actuating mechanism having a second released position permitting rotation of said disc and said shaft;

a plurality of separator springs urging said pressure plate in an axial direction away from said end plate to reduce brake drag when said actuating mechanism is in said released position, each said separator spring comprising a stepped helical coiled spring having a first diameter section and a second smaller diameter section, said coiled spring being coiled about an axis which extends along said axial direction and provides biased separation of said pressure plate away from said end plate along said axis.

5. The brake mechanism according to claim 4 wherein said stepped helical coiled spring is an integral member comprising a plurality of integrally wound coils having a step transition in diameter between said first section and said second section, said step transition being at an axially facing abutment surface of said pressure plate.

6. The brake mechanism according to claim 5 wherein the helix of said first section of said coiled spring extends axially from said abutment surface, and wherein the helix of said second section of said coiled spring extends from said abutment surface axially away from said first section.

7. The brake mechanism according to claim 6 wherein the integrally wound coils of said second section axially abut each other in tight wound relation in each of said first and second positions of said actuating mechanism.

8. The brake mechanism according to claim 7 wherein said pressure plate has an aperture therethrough, and wherein said second section of said coiled spring extends axially through said aperture in press-fit relation to retain said spring on said pressure plate.

9. A brake mechanism for selectively stopping and permitting rotation of a shaft journaled in a motor frame, comprising:

a friction disc secured to said shaft for rotation therewith about the axis of said shaft;

an end plate secured to said motor frame;

a pressure plate axially movable toward and away from said friction disc and restrained against rotation, said pressure plate having a plurality of axially extending holes spaced radially outward of said friction disc;

an actuating mechanism having a first braking position applying a force against said pressure plate in an axial direction toward said end plate to engage said disc and stop rotation of said disc and said shaft, said actuating mechanism having a second released position permitting rotation of said disc and said shaft;

a plurality of separator springs urging said pressure plate in an axial direction away from said end plate to reduce brake drag when said actuating mechanism is in said released position, each separator spring comprising a stepped helical coiled spring having a first diameter section and a second smaller diameter section, each of said second sections extending into a respective said hole in said pressure plate, said coiled spring being coiled about an axis which extends along said axial direction and provides biased separation of said pressure plate away from said end plate along said axis.

10. The brake mechanism according to claim 9 wherein each of said second sections comprises a plurality of integrally wound coils axially abutting each other in tight wound relation and press-fit into a respective said hole.

11. The brake mechanism according to claim 10 wherein said second section extends axially away from said first section and into a respective said hole, and wherein the diameters of at least some of said coils of said second section decrease as said second section extends away from said first section, such that the diameters of coils of said second section farthest away from said first section are smaller than the diameters of coils of said second section closer to said first section, such that said second section tapers to a narrower width as it extends away from said first section, the narrowing taper facilitating ease of insertion of said second section into said hole.

* * * * *